(12) United States Patent
Horiguchi et al.

(10) Patent No.: US 11,947,486 B2
(45) Date of Patent: Apr. 2, 2024

(54) ELECTRONIC COMPUTING DEVICE HAVING IMPROVED COMPUTING EFFICIENCY

(71) Applicant: Hitachi Astemo, Ltd., Hitachinaka (JP)

(72) Inventors: Tatsuya Horiguchi, Tokyo (JP);
Tasuku Ishigooka, Tokyo (JP);
Kazuyoshi Serizawa, Tokyo (JP);
Tsunamichi Tsukidate, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 110 days.

(21) Appl. No.: 17/604,658

(22) PCT Filed: Mar. 25, 2020

(86) PCT No.: PCT/JP2020/013209
§ 371 (c)(1),
(2) Date: Oct. 18, 2021

(87) PCT Pub. No.: WO2020/217826
PCT Pub. Date: Oct. 29, 2020

(65) Prior Publication Data
US 2022/0214993 A1    Jul. 7, 2022

(30) Foreign Application Priority Data

Apr. 23, 2019  (JP) ................................ 2019-081651

(51) Int. Cl.
*G06F 15/00* (2006.01)
*G06F 15/173* (2006.01)
*G06F 15/78* (2006.01)

(52) U.S. Cl.
CPC .... *G06F 15/7814* (2013.01); *G06F 15/17306* (2013.01)

(58) Field of Classification Search
CPC .......... G06F 15/7814; G06F 15/17306; G06F 9/505; G06F 2209/509; G06F 9/38
See application file for complete search history.

(56) References Cited

U.S. PATENT DOCUMENTS

| | | | | |
|---|---|---|---|---|
| 9,703,603 | B1* | 7/2017 | Roy | G06F 9/3877 |
| 2007/0245120 | A1* | 10/2007 | Chang | G06F 9/30145 |
| | | | | 712/10 |
| 2018/0217792 | A1* | 8/2018 | Matsushita | G06F 3/1252 |

FOREIGN PATENT DOCUMENTS

| | | |
|---|---|---|
| JP | 2008-171153 A | 7/2008 |
| JP | 2011-042056 A | 3/2011 |

(Continued)

OTHER PUBLICATIONS

International Search Report with English translation and Written Opinion issued in corresponding application No. PCT/JP2020/013209 dated Jul. 21, 2020.

(Continued)

*Primary Examiner* — Corey S Faherty
(74) *Attorney, Agent, or Firm* — Foley & Lardner LLP

(57) ABSTRACT

The computing efficiency of an electronic computing device is improved. HPCs 20 to 23 include arithmetic processing units HA0 to HA3, respectively. Each of the arithmetic processing units HA0 to HA3 executes arithmetic processing in parallel. LPCs 30 to 33 includes management processing units LB0 to LB3, respectively. Each of the management processing units LB0 to LB3 manages execution of specific processing by an accelerator 6 when each of the arithmetic processing units HA0 to HA3 causes the accelerator 6 to execute the specific processing, and performs a series of commands for causing the accelerator 6 to execute the specific processing on a DMA controller 5 and the accelerator 6.

10 Claims, 7 Drawing Sheets

(56) References Cited

FOREIGN PATENT DOCUMENTS

| | | | |
|---|---|---|---|
| JP | 2017-105163 A | | 6/2017 |
| JP | 2017105163 A | * | 6/2017 |
| JP | 2018-122463 A | | 8/2018 |

OTHER PUBLICATIONS

Office Action in corresponding Japanese Patent Application No. 2019-081651, dated Oct. 4, 2022, with English translation (8 pages).

* cited by examiner

ELECTRONIC COMPUTING DEVICE HAVING IMPROVED COMPUTING EFFICIENCY

TECHNICAL FIELD

The present invention relates to an electronic computing device applicable to an electronic control unit (hereinafter, referred to as ECU) and the like.

BACKGROUND ART

In recent years, in the development of a system that supports an industrial electronic control unit, an increase in load of an application such as improvement in control performance, coping with stricter regulations, and an increase in control arithmetic processing accompanying autonomous devices have been advanced. In response to such an increase in load, in order to realize high performance such as many-core conversion and use of an accelerator in an ECU, a system on chip (SoC) in which a processor having a multi-core or a many-core, peripheral resources such as a memory, an accelerator, and the like are mixed has appeared, and complexity of an electronic computing device has been increased.

On the other hand, in the embedded field, there is a strong real-time constraint because it is necessary to transmit control calculation results in the preceding controller to the subsequent controller or actuator at a specified timing. Therefore, there is a demand for a method of using an electronic computing device that achieves both complication of a control device due to high load of an application and compliance with a real-time constraint.

In particular, PTL 1 discloses a method for realizing high responsiveness by intentionally adjusting a core load factor for a multi-core processor from the viewpoint of high responsiveness focusing on real-time characteristics.

CITATION LIST

Patent Literature

PTL 1: JP 2008-171153 A

SUMMARY OF INVENTION

Technical Problem

However, in the method disclosed in PTL 1, while the real-time property is strongly considered, the background of the high load of the application in the embedded field and the requirements such as the power consumption, the cost, and the calorific value as the conflict axis according to the application destination are not necessarily thoroughly considered.

Taking an autonomous system as an example, in particular, the load of applications that perform from the recognition of the surrounding environment to the operation plan of the own is greatly increased, but these applications are periodic processing based on periodic sensing. In contrast to such periodic processing, it can be said that processing that requires immediate response to the occurrence of a situation such as an emergency stop in a situation that may harm the surrounding environment is an event-driven processing. Both types of processing require constant real-time properties, but the former also places importance on throughput from the viewpoint of an increase in load.

The present invention has been made in view of the above circumstances, and an object thereof is to provide an electronic computing device capable of improving computing efficiency.

Solution to Problem

In order to achieve the above object, an electronic computing device according to a first aspect includes: a first computing resource configured to execute first processing; a second computing resource configured to execute second processing; and a third computing resource configured to manage execution of the second processing by the second computing resource on the basis of calling of the second computing resource from the first computing resource.

Advantageous Effects of Invention

According to the present invention, the computing efficiency of the electronic computing device can be improved.

DESCRIPTION OF EMBODIMENTS

Embodiments will be described with reference to the drawings. Further, the embodiments described below do not limit the scope of the invention. Not all the elements and combinations thereof described in the embodiments are essential to the solution of the invention.

Figure 1:
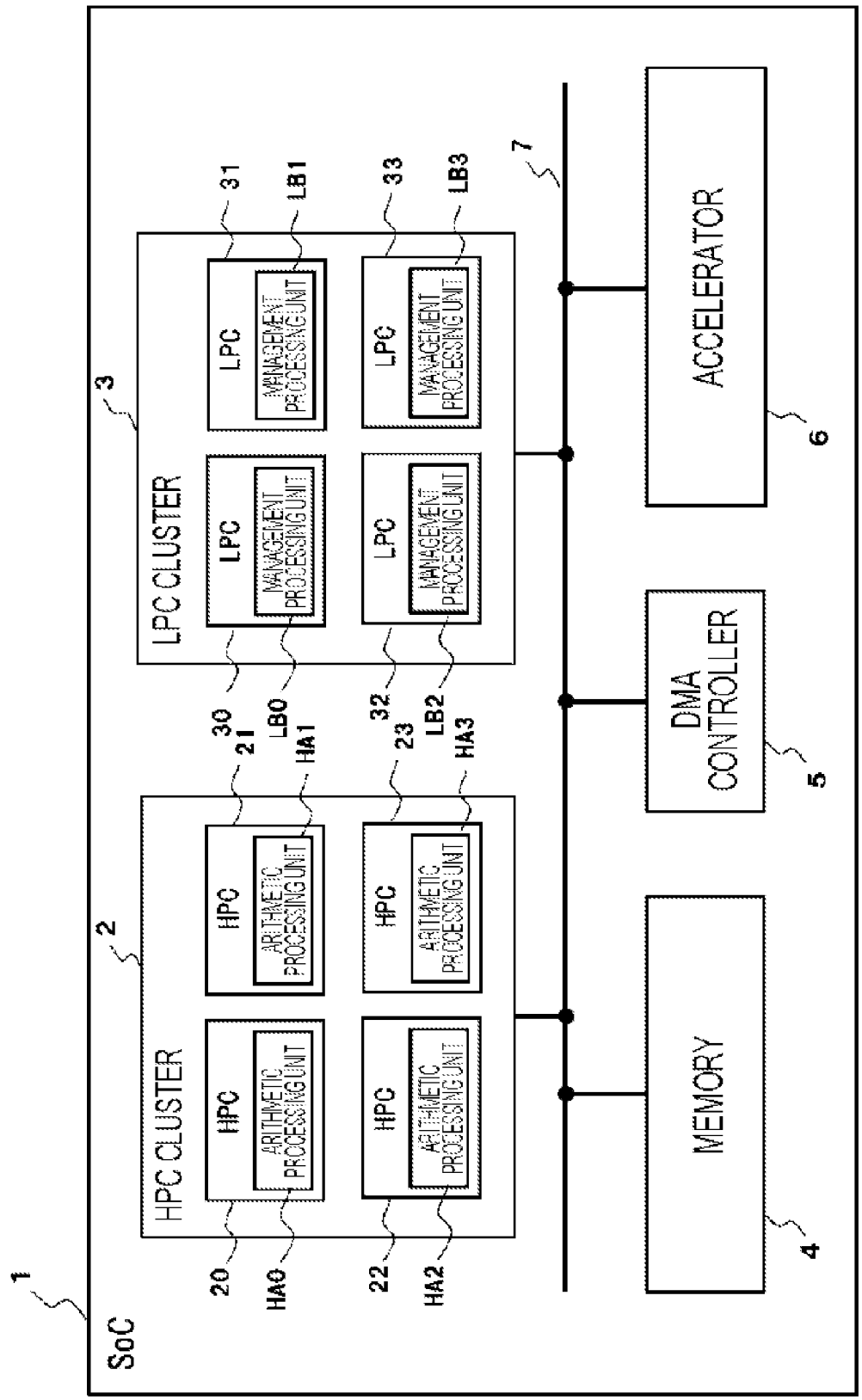
FIG. 1 is a block diagram illustrating a configuration of an SoC to which an electronic computing device according to a first embodiment is applied.

FIG. 1 is a block diagram illustrating a configuration of an SoC to which an electronic computing device according to a first embodiment is applied.

In FIG. 1, the SoC 1 includes a high performance core (HPC) cluster 2, a low performance core (LPC) cluster 3, a memory 4, a direct memory access (DMA) controller 5, and an accelerator 6. The HPC cluster 2, the LPC cluster 3, the memory 4, the DMA controller 5 and the accelerator 6 are mutually connected via an internal bus 7. Here, the HPC cluster 2 can be used as a first computing resource that executes first processing, the accelerator 6 can be used as a second computing resource that executes second processing, and the LPC cluster 3 can be used as a third computing resource that manages the execution of the second processing by the second computing resource.

The HPC cluster 2 is a set of CPU cores (hereinafter, referred to as HPC) having relatively high processing performance. The LPC cluster 3 is a set of CPU cores (hereinafter, referred to as LPC) having relatively low processing performance. At this time, the SoC 1 has a heterogeneous configuration including a plurality of CPU cores (application cores) having different processing performance.

On the SoC 1, two types of applications are operated: an application that periodically operates and an application that operates in response to an event. At this time, it is possible to allocate periodic processing with a relatively heavy load mainly to the HPC and allocate event-driven processing with a relatively low load mainly to the LPC.

The HPC cluster 2 includes HPCs 20 to 23. Each of the HPCs 20 to 23 can execute general-purpose processing described in a program. Each of the HPCs 20 to 23 includes arithmetic processing units HA0 to HA3.

Each of the arithmetic processing units HA0 to HA3 executes arithmetic processing. At this time, each of the arithmetic processing units HA0 to HA3 can execute arithmetic processing in parallel. In addition, each of the arithmetic processing units HA0 to HA3 can call the accelerator 6 and cause the accelerator 6 to execute specific processing. When each of the arithmetic processing units HA0 to HA3 causes the accelerator 6 to execute specific processing, the computing load of each of the HPCs 20 to 23 can be reduced. The arithmetic processing by each of the arithmetic processing units HA0 to HA3 and the specific processing by the accelerator 6 can be executed in parallel.

The LPC cluster 3 includes LPCs 30 to 33. Each of the LPCs 30 to 33 includes management processing units LB0 to LB3.

Each of the management processing units LB0 to LB3 manages execution of the specific processing by the accelerator 6 when each of the arithmetic processing units HA0 to HA3 causes the accelerator 6 to execute the specific processing. At this time, the management processing units LB0 to LB3 can issue a series of commands for causing the accelerator 6 to execute specific processing to the DMA controller 5 and the accelerator 6.

The memory 4 can be configured by, for example, a semiconductor memory such as an SRAM or a DRAM. The memory 4 can store programs being executed by each of the HPCs 20 to 23, each of the LPCs 30 to 33, and the accelerator 6, and can be provided with a work area for each of the HPCs 20 to 23, each of the LPCs 30 to 33, and the accelerator 6 to execute the program.

The DMA controller 5 controls DMA transfer at the time of data transfer between each of the HPCs 20 to 23 and the accelerator 6. At this time, the DMA controller 5 can operate as an interrupt controller.

The accelerator 6 executes specific processing. This specific processing can be processing with a heavier load than the processing executed by the HPCs 20 to 23. This specific processing is, for example, deep learning, matrix operation, image processing, or the like. The accelerator 6 may be a CPU including a plurality of cores, or may be dedicated hardware such as an application specific integrated circuit (ASIC) or a field-programmable gate array (FPGA). When a CPU including a plurality of cores is used as the accelerator 6, specific processing can be executed based on a program.

Figure 2:
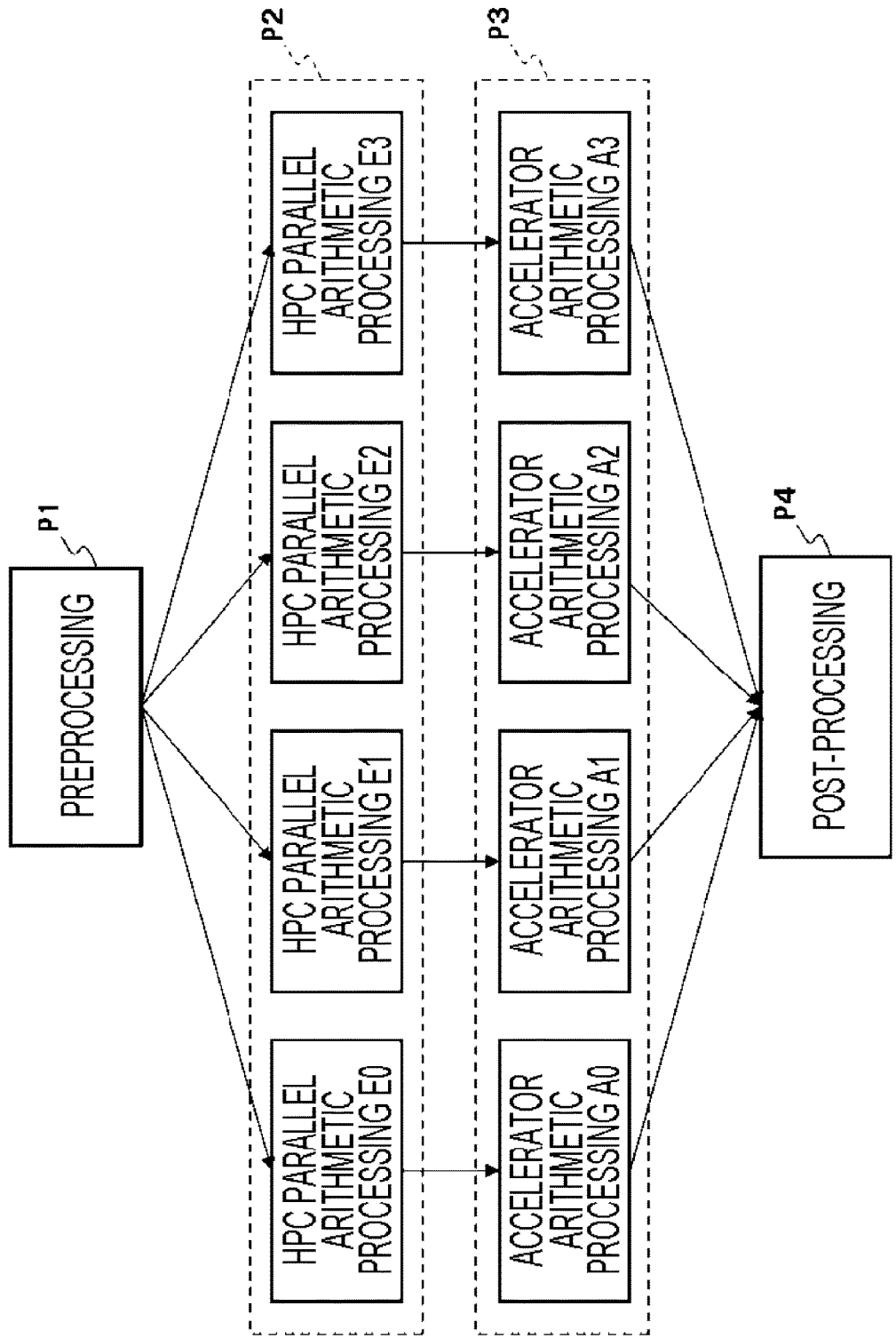
FIG. 2 is a block diagram illustrating a flow of periodic processing executed in the SoC of FIG. 1.

FIG. 2 is a block diagram illustrating a flow of periodic processing executed by the SoC of FIG. 1.

In FIG. 2, the HPC cluster 2 in FIG. 1 executes preprocessing P1 and then executes HPC parallel arithmetic processing P2. In the HPC parallel arithmetic processing P2, the HPC cluster 2 calls the accelerator processing P3 and executes post-processing P4 after the accelerator processing P3.

In the HPC parallel arithmetic processing P2, each of the HPCs 20 to 23 in FIG. 1 executes HPC parallel arithmetic processing E0 to E3, and individually calls accelerator arithmetic processing A0 to A3 from each of the HPC parallel arithmetic processing E0 to E3. It is assumed that an operating system (OS) process is performed on the LPC cluster 3.

In a case where processing is performed by asynchronously operating each of the HPCs 20 to 23 in the HPC cluster 2 and the accelerator 6, the following series of procedures is required when operating the accelerator 6. This series of procedures is referred to as accelerator management processing. Any one of the management processing units LB0 to LB3 of each of the LPCs 30 to 33 can execute the accelerator management processing. The management processing units LB0 to LB3 that execute the accelerator management processing can be designated by the OS. The OS can select the management processing units LB0 to LB3 that execute the accelerator management processing based on the load of processing being executed by each of the LPCs 30 to 33.

Figure 3:
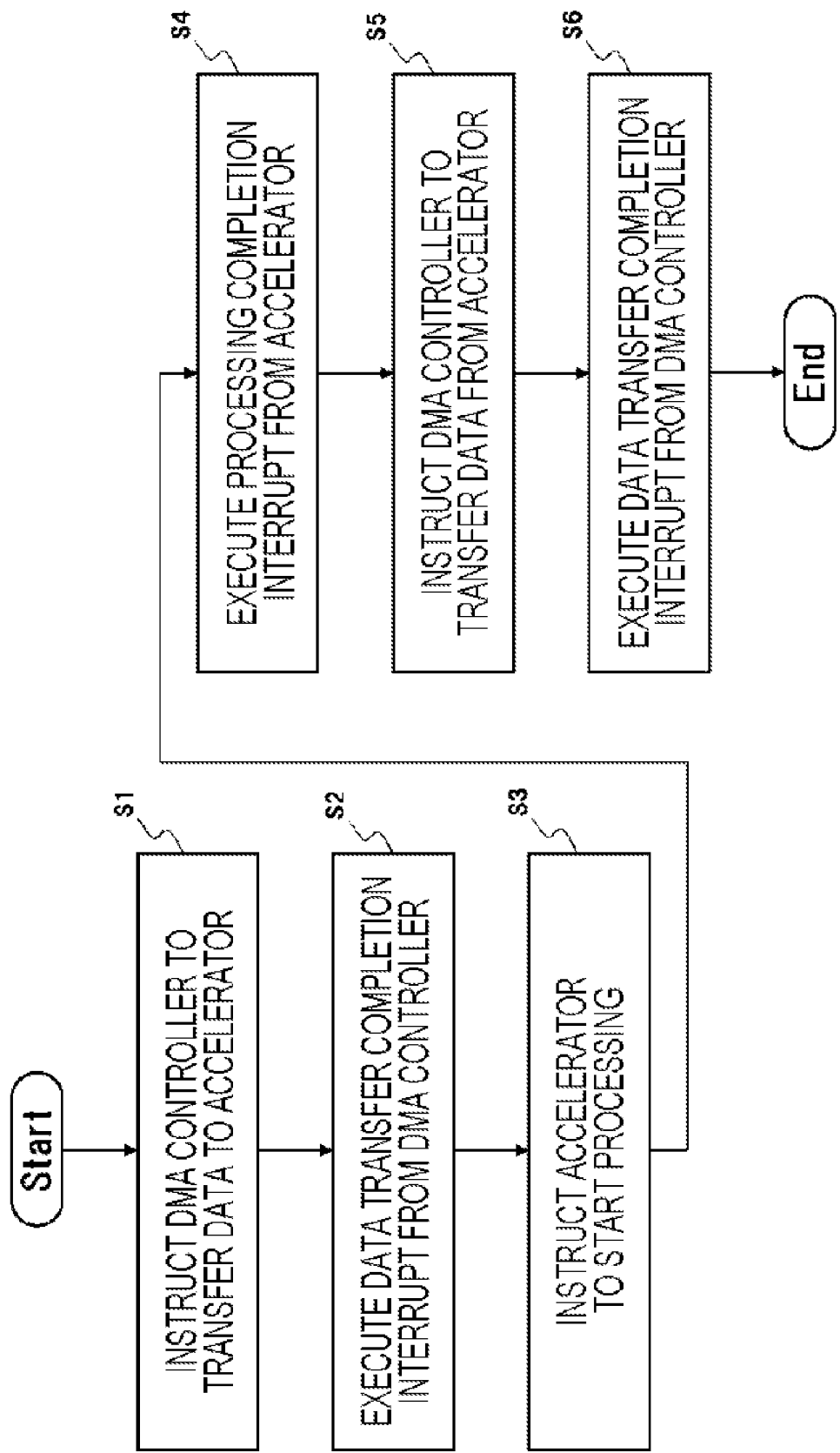
FIG. 3 is a flowchart illustrating accelerator management processing.

FIG. 3 is a flowchart illustrating the accelerator management processing.

In FIG. 3, each core using the accelerator 6 in FIG. 1 instructs the DMA controller 5 to transfer data to the accelerator 6 (S1).

Next, when the data transfer instructed in S1 is completed, the DMA controller 5 executes a data transfer completion interrupt to each core (S2).

Next, each core on which the data transfer completion interrupt is executed instructs the accelerator 6 to start processing (S3).

Next, the accelerator 6 executes a process completion interrupt to each core that has instructed the start of the process (S4).

Next, each core that has executed the process completion interrupt instructs the DMA controller 5 to transfer data from the accelerator 6 (S5).

Next, the DMA controller 5 executes data transfer completion interrupt to each core that has instructed data transfer (S6).

Figure 4:
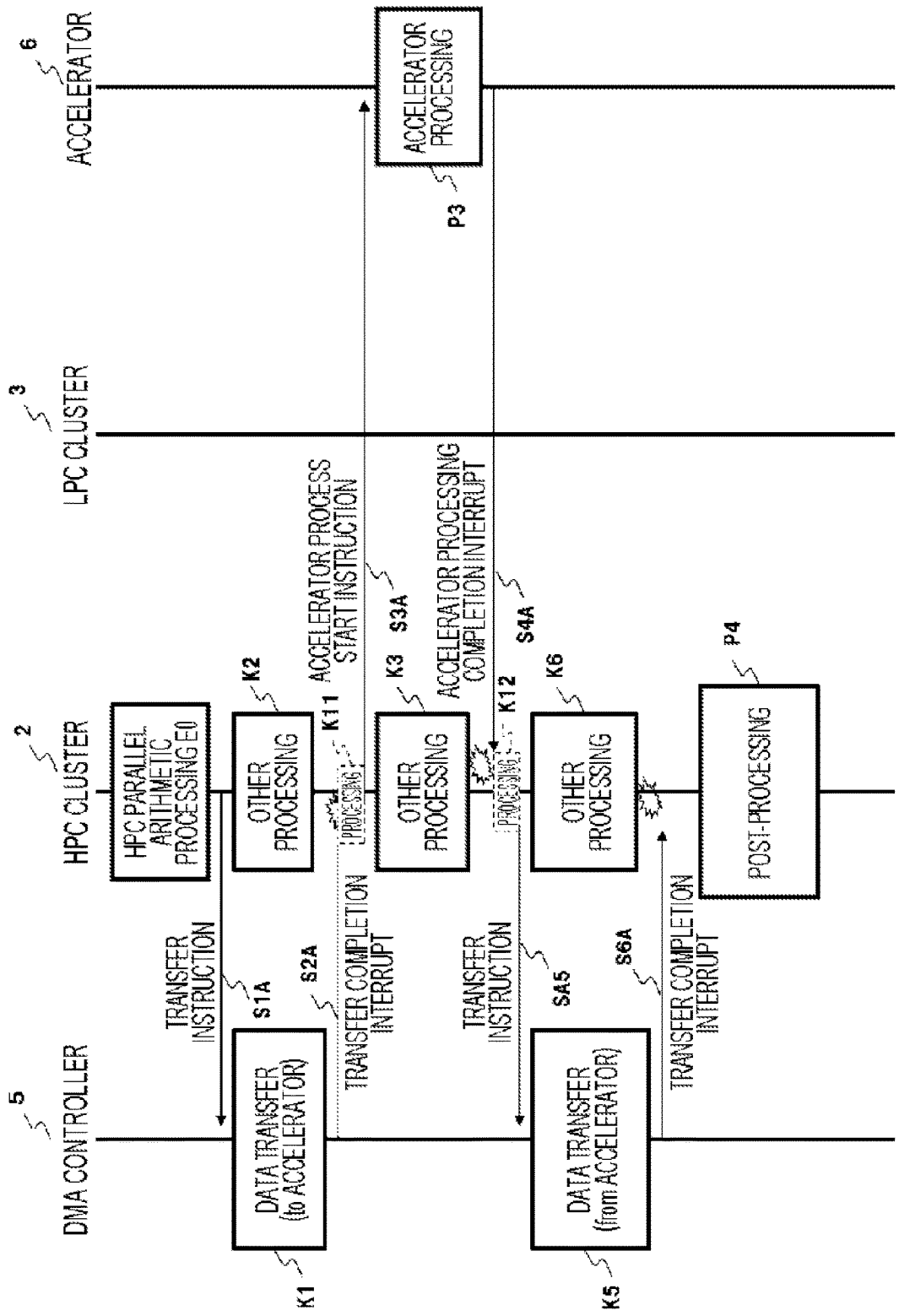
FIG. 4 is a sequence diagram illustrating a flow of processing involving interrupt to a core using an accelerator.

FIG. 4 is a sequence diagram illustrating a flow of processing involving interrupt to a core using an accelerator. Note that FIG. 4 focuses on one HPC 20 in the HPC cluster 2 of FIG. 1, and illustrates an example in which the HPC 20 using the accelerator 6 performs the accelerator management processing.

In FIG. 4, when the HPC parallel arithmetic processing E0 is completed, the HPC 20 in FIG. 1 instructs the DMA controller 5 to transfer data to the accelerator 6 (S1A).

When the data transfer to the accelerator 6 is instructed from the HPC 20, the DMA controller 5 executes the data transfer to the accelerator 6 (K1). During data transfer to the accelerator 6, the HPC cluster 2 may perform other processing K2, such as another application.

Next, when the data transfer instructed from the HPC 20 is completed, the DMA controller 5 executes a data transfer completion interrupt to the HPC 20 (S2A). At this time, the HPC 20 interrupts the other processing K2, executes a process K11 of issuing an accelerator process start instruction, and then executes the accelerator process start instruction (S3A).

Next, after executing the accelerator processing P3 instructed from the HPC 20, the accelerator 6 executes an accelerator process completion interrupt to the HPC 20 (S4A). While the accelerator 6 is executing the processing instructed from the HPC 20, the HPC cluster 2 can execute the other processing K3 such as another application.

When the accelerator process completion interrupt is executed, the HPC 20 interrupts the other processing K3, executes a process K12 for instructing the DMA controller 5 to transfer data from the accelerator 6, and then executes an instruction to transfer data from the accelerator 6 (S5A).

When the data transfer from the accelerator 6 is instructed from the HPC 20, the DMA controller 5 executes the data transfer from the accelerator 6 (K5). During data transfer from the accelerator 6, the HPC cluster 2 may execute other processing K6, such as another application.

Next, when the data transfer from the accelerator 6 is completed, the DMA controller 5 executes a data transfer completion interrupt to the HPC 20 (S6A). When the data transfer completion interrupt is executed, the HPC 20 interrupts the other processing K6.

From the above, when the HPC 20 and the accelerator 6 operate asynchronously, the HPC 20 can execute another application during the operation of the DMA controller 5 or the accelerator 6. At this time, in the HPC 20, the interrupt processing is performed 3 times until the completion of the post-processing P4, an interrupt handler operates every time the interrupt is performed, and the processing is interrupted by the context switch. As the influence of the interrupt of the processing, not only the overhead of the context switch but also the cache hit rates in the other processing K2 and K3 due to execution of the other processing K11 and K12 after interrupt of the other processing K2 and K3 are reduced, thereby reducing the effective performance.

Figure 5:
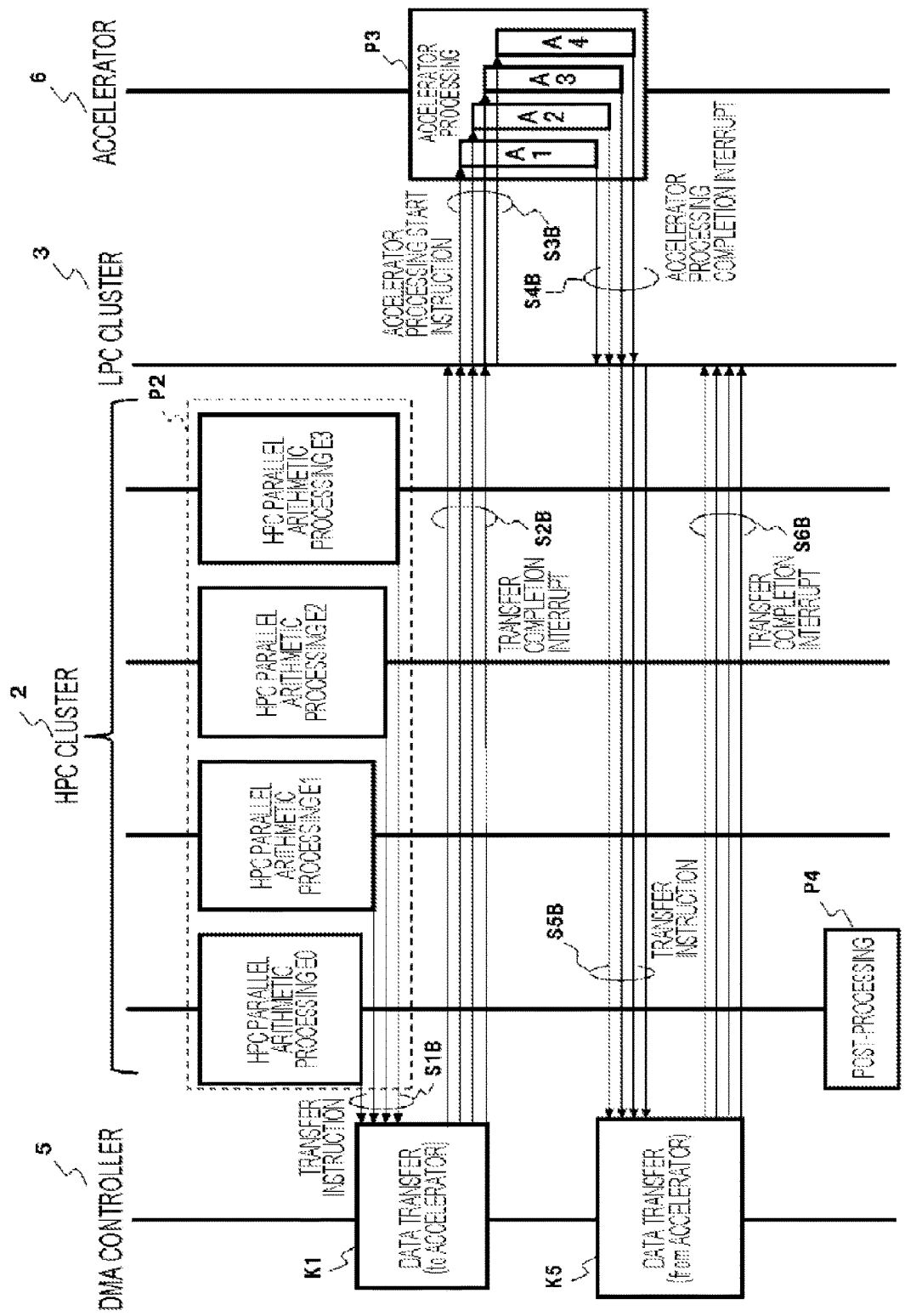
FIG. 5 is a sequence diagram illustrating a flow of processing without interrupt to a core using an accelerator.

FIG. 5 is a sequence diagram illustrating a flow of processing without interrupt to the core using the accelerator. Note that FIG. 5 illustrates an example in which the four HPCs 20 to 23 in the HPC cluster 2 in FIG. 1 execute parallel processing using the accelerator 6, and one of the LPCs 30 to 33 in the LPC cluster 3 performs the accelerator management processing.

Although the other processing K2, K3, and K6 in FIG. 4 are not illustrated in FIG. 5, after the execution of the HPC parallel arithmetic processing E0 to E3, each of the HPCs 20 to 23 can execute the other processing K2, K3, and K6 in all the times except for the execution of the post-processing P4.

In FIG. 5, processing S2 to S6 among the accelerator management processing illustrated in FIG. 3 are separated from the HPCs 20 to 23 using the accelerator 6 and allocated to any of LPCs 30 to 33 in the LPC cluster 3. In the following description, a case where the accelerator management processing is allocated to the LPC 30 in the LPC cluster 3 will be taken as an example.

That is, when the HPC parallel arithmetic processing E0 to E3 are completed, each of the HPCs 20 to 23 instructs the DMA controller 5 to transfer data to the accelerator 6 (S1B). When the data transfer to the accelerator 6 is instructed from each of the HPCs 20 to 23, the DMA controller 5 executes the data transfer to the accelerator 6 (K1). During the data transfer to the accelerator 6, each of the HPCs 20 to 23 can execute other processing such as another application in parallel.

Next, when the data transfer instructed from each of the HPCs 20 to 23 is completed, the DMA controller 5 executes a data transfer completion interrupt to the LPC 30 in the LPC cluster 3 (S2B).

Next, when the data transfer completion interrupt is executed, the LPC 30 in the LPC cluster 3 executes an instruction to start the accelerator processing P3 to the accelerator 6 (S3B). At this time, each of the HPCs 20 to 23 can continuously execute other processing such as another application without interrupt.

Next, after executing the accelerator processing P3 instructed from the LPC 30 in the LPC cluster 3, the accelerator 6 executes the accelerator process completion interrupt to the LPC 30 (S4B). In the accelerator processing P3, the accelerator arithmetic processing A0 to A3 called from each of the HPCs 20 to 23 is executed in parallel. While the accelerator 6 is executing the processing instructed from the LPC 30, each of the HPCs 20 to 23 can execute other processing such as another application in parallel.

When the accelerator process completion interrupt is executed, the LPC 30 in the LPC cluster 3 instructs the DMA controller 5 to transfer data from the accelerator 6 (S5B). At this time, each of the HPCs 20 to 23 can continuously execute other processing such as another application without interrupt.

When the data transfer from the accelerator 6 is instructed from the LPC 30, the DMA controller 5 executes the data transfer from the accelerator 6 (K5). During data transfer from the accelerator 6, each of the HPCs 20 to 23 can execute other processing such as another application in parallel.

Next, when the data transfer from the accelerator 6 is completed, the DMA controller 5 executes a data transfer completion interrupt to the LPC 30 in the LPC cluster 3 (S6B). At this time, each of the HPCs 20 to 23 can continuously execute other processing such as another application without interrupt.

As a result, each of the HPCs 20 to 23 can be continuously executed without interrupting other processing by the interrupt processing occurring in S2B, S4B, and S6B. Therefore, since the cache hit rate is maintained by a certain amount and no context switch occurs, it is possible to suppress a decrease in execution performance due to the use of the accelerator 6.

In addition, since the event-driven processing with a relatively low load is mainly allocated to each core of the LPCs 30 to 33 in the LPC cluster 3, the decrease in the execution performance due to the increase in the interrupt processing to the LPC cluster 3 is sufficiently lower than that of the HPC cluster, and the processing performance of the entire SoC 1 can be relatively improved.

In FIG. 5, an example is assumed in which the data transfer completion interrupt (S6B) from the DMA controller 5 is processed by any one of the LPCs 30 to 33 in the LPC cluster, and after the completion of the accelerator processing P3 is confirmed, the start of the post-processing P4 is notified to any one of the HPCs 20 to 23 in the HPC cluster 2 through an OS event. However, the procedure described in the present embodiment does not necessarily have to be taken.

In addition, in the present embodiment, an example in which the CPU core and the accelerator are asynchronously executed has been described, but as another embodiment, a method of performing processing by synchronizing the CPU core and the accelerator can be adopted. In a case where the CPU core and the accelerator are executed synchronously, an example is assumed in which each CPU core periodically accesses the accelerator and performs polling for checking an end state. In another embodiment, even in such a case, any of the LPCs 30 to 33 in the LPC cluster 3 can substitute polling for the accelerator 6, and other processing can be executed in the HPC cluster 2 suitable for high-performance processing, whereby the processing performance of the entire SoC 1 can be improved.

A user who uses the SoC 1 may need to describe a program for implementing the above procedure. That is, in the accelerator management processing including a series of commands, in a case where it is necessary to explicitly indicate the core that performs the accelerator management processing, for example, the core can be described in the source code of the user application using the following pragma description.

pragma AccManagement LPC #1

The above pragma description uses, for example, a pragma (AccManagement) for designating a core to perform the accelerator management processing, and then designates the core. This example indicates that the first core (LPC #1) in the LPC cluster 3 is used instead of the core in the HPC cluster 2.

In addition, there are various forms of the pragma description method, and for example, various use methods are assumed such as a case where any core in the LPC cluster 3 may be used, a case where any core in the HPC cluster 2 and the LPC cluster 3 can be used, and a case where the core itself that performs processing of calling an accelerator manages the pragma description method.

In this example, the following description can be made according to each usage method. #pragma AccManagement LPC#any#pragma AccManagement any#pragma AccManagement self In the present embodiment, the above pragma method is taken as an example, but for example, an example in which the above core specification is included in the argument of the accelerator call function may be used, and the method of explicitly indicating the core that performs the accelerator management processing is not limited to the above pragma method.

In addition, in the above-described embodiment, two types of CPU core configurations and a pragma description scheme as a programming model are illustrated, but the present invention is not limited thereto.

Figure 6:
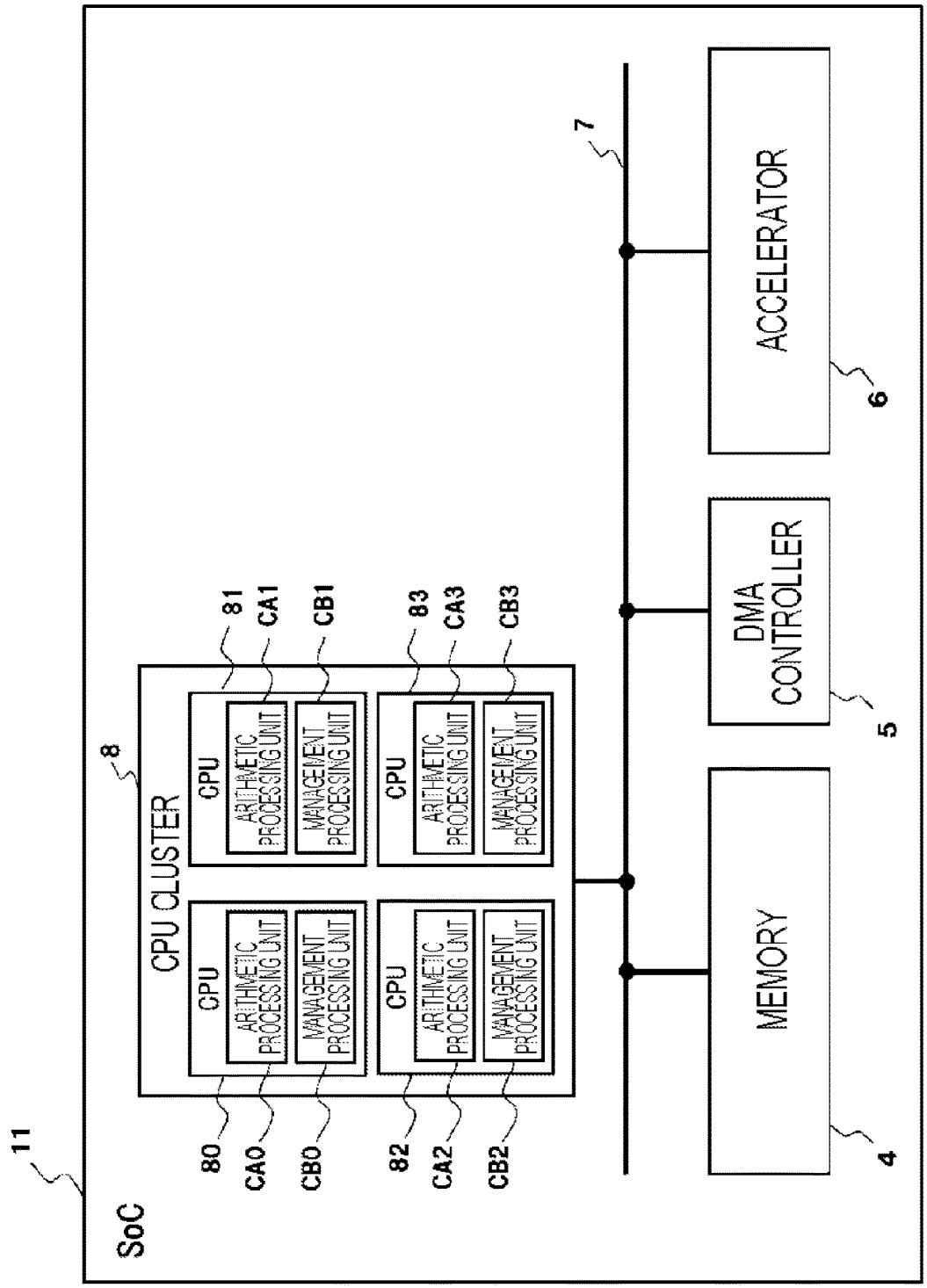
FIG. 6 is a block diagram illustrating a configuration of an SoC to which an electronic computing device according to a second embodiment is applied.

FIG. 6 is a block diagram illustrating a configuration of an SoC to which an electronic computing device according to a second embodiment is applied.

In FIG. 6, the SoC 11 includes a CPU cluster 8, a memory 4, a DMA controller 5, and an accelerator 6. The CPU cluster 8, the memory 4, the DMA controller 5, and the accelerator 6 are mutually connected via the internal bus 7. On the SoC 11, two types of applications are operated: an application that periodically operates and an application that operates in response to an event.

The CPU cluster 8 is a set of CPU cores. At this time, the SoC 11 has a homogeneous configuration including a plurality of CPU cores (application cores) having no difference in processing performance. Here, some of the CPU cores of the CPU cluster 8 can be used as a first computing resource that executes the first processing, the accelerator 6 can be used as a second computing resource that executes the second processing, and the other CPU cores of the CPU cluster 8 can be used as a third computing resource that manages execution of the second processing by the second computing resource.

The CPU cluster 8 includes CPU cores 80 to 83. The CPU cores 80 to 83 can execute general-purpose processing described in a program. The CPU cores 80 to 83 includes arithmetic processing units CA0 to CA3 and management processing units CB0 to CB3 respectively.

Each of the arithmetic processing units CA0 to CA3 executes arithmetic processing. At this time, each of the arithmetic processing units CA0 to CA3 can execute arithmetic processing in parallel. In addition, each of the arithmetic processing units CA0 to CA3 can call the accelerator 6 and cause the accelerator 6 to execute specific processing. The arithmetic processing by each of the arithmetic processing units CA0 to CA3 and the specific processing by the accelerator 6 can be executed in parallel.

Each of the management processing units CB0 to CB3 manages execution of the specific processing by the accelerator 6 when each of the arithmetic processing units CA0 to CA3 causes the accelerator 6 to execute the specific processing. At this time, the management processing units CB0 to CB3 can issue a series of commands for causing the accelerator 6 to execute specific processing to the DMA controller 5 and the accelerator 6.

The CPU cluster 8 executes CPU parallel arithmetic processing after executing the preprocessing similarly to the processing of FIG. 2. In the CPU parallel arithmetic processing, the CPU cluster 8 calls the accelerator processing and executes post-processing after the accelerator processing.

Each of the CPU cores 80 to 83 executes the CPU parallel arithmetic processing, and individually calls accelerator arithmetic processing from each CPU parallel arithmetic processing. It is assumed that an operating system (OS) process is performed by any CPU cores 80 to 83 in the CPU cluster 8.

In a case where the CPU cores 80 to 83 in the CPU cluster 8 and the accelerator 6 are operated asynchronously to perform processing, when the accelerator 6 is operated, a series of procedures similar to those in FIG. 3 is required.

Figure 7:
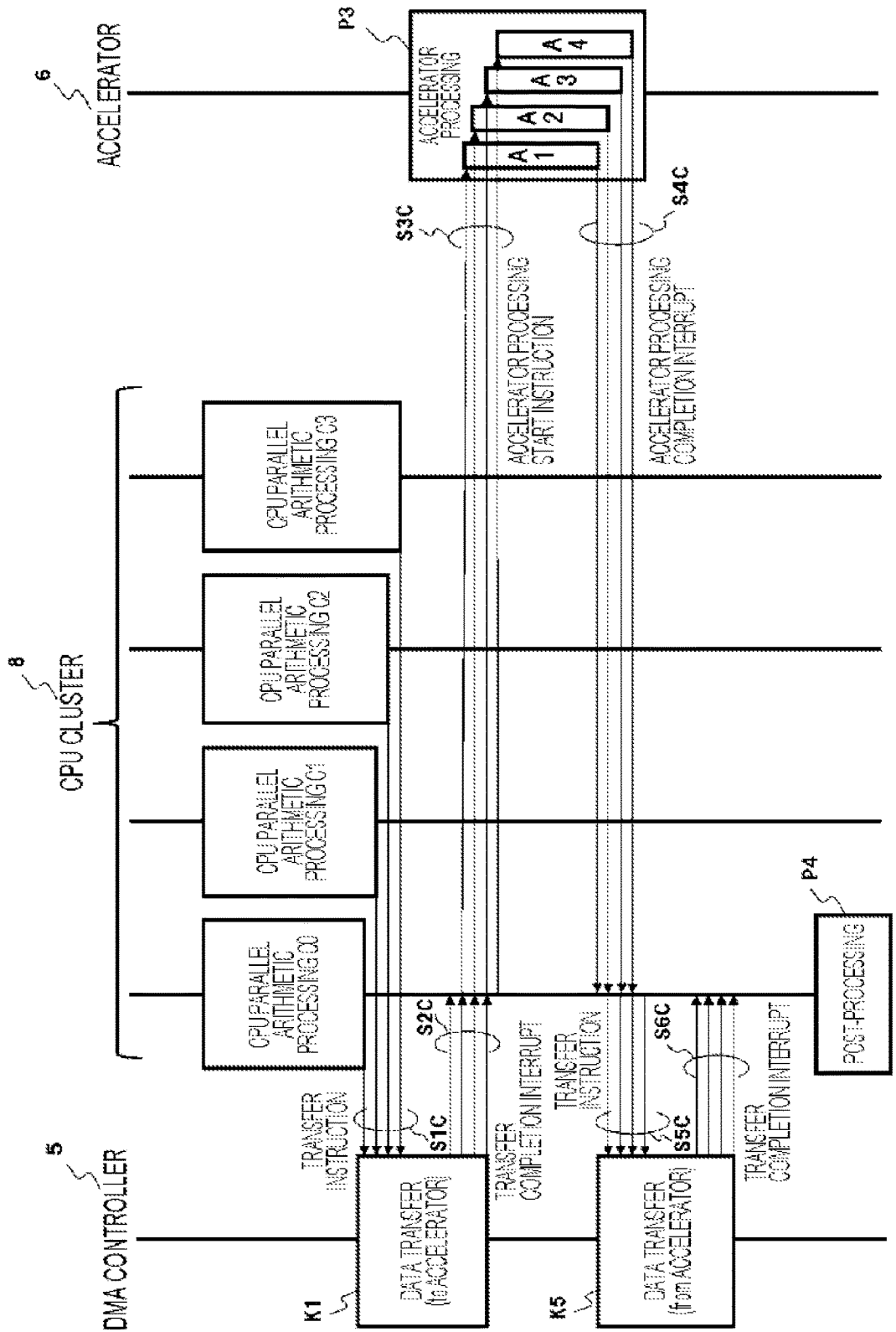
FIG. 7 is a sequence diagram illustrating a flow of processing of a DMA controller, a CPU cluster, and an accelerator in FIG. 6.

FIG. 7 is a sequence diagram illustrating a flow of processing of the DMA controller, the CPU cluster, and the accelerator in FIG. 6. Note that FIG. 7 illustrates an example in which the four CPU cores 80 to 83 in the CPU cluster 8 of FIG. 6 execute parallel processing using the accelerator 6, and one CPU core 80 in the CPU cluster 8 performs the accelerator management processing.

Although the other processing K2, K3, and K6 of FIG. 4 are not illustrated in FIG. 7, the CPU cores 81 to 83 can execute the other processing K2, K3, and K6 after the CPU parallel arithmetic processing C1 to C3 in all the times except for the execution of the post-processing P4.

In FIG. 7, processing S2 to S6 among the accelerator management processing illustrated in FIG. 3 are separated from the CPU cores 81 to 83 using the accelerator 6 and allocated to the CPU core 80 in the CPU cluster 8.

That is, when CPU parallel arithmetic processing C0 to C3 are completed, each of the CPU cores 80 to 83 instructs the DMA controller 5 to transfer data to the accelerator 6 (S1C).

When the data transfer to the accelerator 6 is instructed from each of the CPU cores 80 to 83, the DMA controller 5 executes the data transfer to the accelerator (K1). During the data transfer to the accelerator 6, each of the CPU cores 81 to 83 can execute other processing such as another application in parallel.

Next, when the data transfer instructed from each of the CPU cores 80 to 83 is completed, the DMA controller 5 executes a data transfer completion interrupt to the CPU core 80 in the CPU cluster 8 (S2C).

Next, when the data transfer completion interrupt is executed, the CPU core 80 in the CPU cluster 8 executes an instruction to start the accelerator processing P3 to the accelerator 6 (S3C).

At this time, each of the CPU cores 81 to 83 can continuously execute other processing such as another application without interrupt.

Next, after executing the accelerator processing P3 instructed by the CPU core 80 in the CPU cluster 8, the accelerator 6 executes the accelerator process completion interrupt to the CPU core 80 (S4C). In the accelerator processing P3, the accelerator arithmetic processing A0 to A3 called from the respective CPU cores 80 to 83 are executed in parallel. While the accelerator 6 is executing the processing instructed from the CPU core 80, each of the CPU cores 81 to 83 can execute other processing such as another application in parallel.

When the accelerator process completion interrupt is executed, the CPU core 80 in the CPU cluster 8 instructs the DMA controller 5 to transfer data from the accelerator 6 (S5C). At this time, each of the CPU cores 81 to 83 can continuously execute other processing such as another application without interrupt.

When the data transfer from the accelerator 6 is instructed from the CPU core 80, the DMA controller 5 executes the data transfer from the accelerator 6 (K5). During data transfer from the accelerator 6, each of the CPU cores 81 to 83 can execute other processing such as another application in parallel.

Next, when the data transfer from the accelerator 6 is completed, the DMA controller 5 executes a data transfer completion interrupt to the CPU core 80 in the CPU cluster 8 (S6C). At this time, each of the CPU cores 81 to 83 can continuously execute other processing such as another application without interrupt.

As a result, each of the CPU cores 81 to 83 can continuously execute the interrupt processing generated in S2C, S4C, and S6C without interrupting other processing. Therefore, since the cache hit rate is maintained to a certain extent and no context switch occurs, it is possible to suppress a decrease in execution performance due to the use of the accelerator 6.

Note that, in the present example, various types of event drive processing (OS processing and other interrupt processing) are not explicitly described, but the utilization efficiency of the other cores can be increased by making the core that executes the accelerator management processing the same core as the core that executes the various types of event-driven processing.

Also in this case, when the CPU core and the accelerator are executed synchronously, the number of cores that can continue the processing can be increased similarly to the first embodiment, so that the processing performance can be improved.

Further, the invention is not limited to the above embodiments, but includes various modifications. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of a certain embodiment. In addition, some of the configurations of each embodiment may be added, omitted, replaced with other configurations. Each of the above configurations, functions, processing units, processing means, and the like may be partially or entirely achieved by hardware by, for example, designing by an integrated circuit.

REFERENCE SIGNS LIST

1 SoC
2 HPC cluster
3 LPC cluster
4 memory
5 DMA controller
6 accelerator

The invention claimed is:

1. An electronic computing device, comprising:
a first computing resource configured to execute first instructions;
a second computing resource configured to execute second instructions; and
a third computing resource configured to manage execution of the second instructions on the second computing resource based on at least one instruction of the first instructions from the first computing resource, wherein:
the first computing resource is a first CPU,
the second computing resource is a second CPU or dedicated hardware,
the third computing resource is a third CPU,
each of the first CPU, the second CPU, and the third CPU includes a plurality of cores,
a core that manages execution of the second instructions by the second computing resource is selected by an operating system (OS), and
the OS selects a core that receives a completion notification at a start of data transfer between the second computing resource and the first computing resource and at a start of execution of the second instructions by the second computing resource.

2. The electronic computing device according to claim 1, wherein the first instructions are associated with a first processing load and the second instructions are associated with a second processing load greater than the first processing load.

3. The electronic computing device according to claim 1, wherein the first computing resource causes the second computing resource to execute the second instructions after the first computing resource executes the first instructions.

4. The electronic computing device according to claim 1, wherein
the first CPU is configured to instruct the second computing resource to execute the second instructions, and
the third CPU is configured to execute at least one or more processes of a process of managing data transfer from the first CPU core to the second computing resource, a process of managing data transfer from the second computing resource to the first CPU core, a process of transmitting a process start notification to the second computing resource, or a process of receiving a process completion notification from the second computing resource after transmitting the process start notification to the second computing resource.

5. The electronic computing device according to claim 1, wherein
the first CPU is configured to instruct the second computing resource to execute the second instructions, and
the third CPU is configured to execute at least one or more processes of a process of managing data transfer from the first CPU core to the second computing resource, a process of managing data transfer from the second computing resource to the first CPU core, a process of transmitting a process start notification to the second computing resource, or a process of periodically monitoring processing completion of the second computing resource after transmitting the process start notification to the second computing resource.

6. The electronic computing device according to claim 1, wherein direct memory access (DMA) transfer is used for data transfer between the first computing resource and the second computing resource.

7. The electronic computing device according to claim 1, wherein the second computing resource is an accelerator.

8. The electronic computing device according to claim 1, wherein the third CPU has a first processing performance and the first CPU has a second processing performance greater than the first processing performance of the third CPU.

9. An electronic computing device, comprising:
- a first computing resource configured to execute first instructions;
- a second computing resource configured to execute second instructions; and
- a third computing resource configured to manage execution of the second instructions on the second computing resource based on at least one instruction of the first instructions from the first computing resource,
- wherein the third computing resource includes a plurality of CPU cores, and
- wherein designation of a CPU core that manages execution of the second instructions by the second computing resource is described in a source code using a pragma.

10. An electronic computing device, comprising:
- a first computing resource configured to execute first instructions;
- a second computing resource configured to execute second instructions; and
- a third computing resource configured to manage execution of the second instructions on the second computing resource based on at least one instruction of the first instructions from the first computing resource,
- wherein the third computing resource includes a plurality of CPU cores, and
- wherein designation of a CPU core that manages execution of the second instructions by the second computing resource is described in a function argument for calling the second computing resource.

* * * * *